United States Patent
Salter et al.

(10) Patent No.: US 11,651,629 B2
(45) Date of Patent: May 16, 2023

(54) ACTIVE AIR DAM NOTIFICATION METHOD AND SYSTEM

(71) Applicant: Ford Global Technologies, LLC, Dearborn, MI (US)

(72) Inventors: Stuart C. Salter, White Lake, MI (US); David Brian Glickman, Southfield, MI (US); Paul Kenneth Dellock, Northville, MI (US); Hussein Berry, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 238 days.

(21) Appl. No.: 17/078,722

(22) Filed: Oct. 23, 2020

(65) Prior Publication Data
US 2022/0130183 A1 Apr. 28, 2022

(51) Int. Cl.
*G07C 5/06* (2006.01)
*B62D 35/00* (2006.01)

(52) U.S. Cl.
CPC ............. *G07C 5/06* (2013.01); *B62D 35/005* (2013.01)

(58) Field of Classification Search
None
See application file for complete search history.

(56) References Cited

U.S. PATENT DOCUMENTS

| | | | |
|---|---|---|---|
| 3,866,854 A * | 2/1975 | Wehner | B60R 22/48 340/457.1 |
| 4,810,022 A * | 3/1989 | Takagi | B62D 35/005 296/180.5 |
| 7,775,582 B2 | 8/2010 | Browne et al. | |
| 9,039,068 B2 | 5/2015 | Niemi et al. | |
| 9,102,366 B1 * | 8/2015 | Kim | B62D 35/005 |
| 9,764,706 B2 | 9/2017 | Benvenuto et al. | |
| 9,783,153 B2 * | 10/2017 | Farooq | B60R 19/023 |
| 10,155,551 B2 | 12/2018 | Miller et al. | |
| 10,647,240 B1 * | 5/2020 | Grieshop | B60P 1/42 |
| 10,679,437 B1 | 6/2020 | Dudar | |
| 11,072,378 B2 * | 7/2021 | Klop | B62D 35/005 |
| 2005/0161269 A1 * | 7/2005 | Khalighi | B62D 35/005 180/116 |
| 2012/0153581 A1 | 6/2012 | Li | |
| 2012/0175859 A1 * | 7/2012 | Roth, Jr. | B60P 3/125 280/491.4 |
| 2015/0084369 A1 * | 3/2015 | Niemi | B62D 35/02 296/180.1 |
| 2015/0225026 A1 * | 8/2015 | Ohira | B62D 25/08 296/180.1 |

(Continued)

FOREIGN PATENT DOCUMENTS

| | | | | |
|---|---|---|---|---|
| CN | 104228737 B | * | 2/2019 | ........... B60R 21/015 |
| DE | 202009002106 U1 | * | 6/2009 | ............... B60Q 9/00 |

(Continued)

*Primary Examiner* — Fekadeselassie Girma
(74) *Attorney, Agent, or Firm* — Vichit Chea; Carlson, Gaskey & Olds, P.C.

(57) ABSTRACT

An active air dam notification method includes, among other things, transitioning an air dam of a vehicle between a first position and a second position, and providing an alert to a user. The alert indicates that the air dam is transitioning. The air dam is vertically higher when the air dam is in the first position than when the air dam is in the second position.

4 Claims, 3 Drawing Sheets

(56) References Cited

U.S. PATENT DOCUMENTS

| | | | |
|---|---|---|---|
| 2016/0229467 A1* | 8/2016 | Miller | G01S 13/931 |
| 2017/0088193 A1* | 3/2017 | Heil | G01M 9/06 |
| 2017/0101136 A1* | 4/2017 | Zielinski | B62D 35/02 |
| 2017/0267294 A1 | 9/2017 | Klop et al. | |

FOREIGN PATENT DOCUMENTS

| | | | | |
|---|---|---|---|---|
| DE | 102010021872 | | 12/2011 | |
| DE | 102019200412 A1 | * | 8/2019 | A61B 5/18 |
| EP | 3663349 A1 | * | 6/2020 | B60C 1/00 |
| GB | 2247867 A | * | 3/1992 | B62D 35/005 |
| GB | 2522904 A | * | 8/2015 | B29C 53/52 |
| JP | 3817780 B2 | * | 9/2006 | |
| JP | 2008168843 | | 7/2008 | |
| JP | 2008168843 A | * | 7/2008 | |
| JP | 2022167409 A | * | 11/2022 | |
| KR | 20010059386 A | * | 7/2001 | B62D 37/02 |
| KR | 200381695 Y1 | * | 4/2005 | |
| KR | 101524010 B1 | * | 5/2015 | |
| KR | 20150084369 A | * | 7/2015 | G06Q 50/08 |
| KR | 101584287 B1 | * | 1/2016 | B62D 37/02 |
| KR | 20160031383 A | * | 3/2016 | |
| TR | 201513520 A2 | * | 5/2017 | |
| WO | WO-0146570 A1 | * | 6/2001 | B60K 13/02 |

\* cited by examiner

US 11,651,629 B2

ACTIVE AIR DAM NOTIFICATION METHOD AND SYSTEM

TECHNICAL FIELD

This disclosure relates generally to an active air dam for a vehicle and, more particularly, to providing an alert when the active air dam is being lowered, being raised, or both.

BACKGROUND

Some vehicles include an active air dam. The active air dam can be lowered and raised to manage airflow. The active air dam can be located at a front of a vehicle.

SUMMARY

An active air dam notification method according to an exemplary aspect of the present disclosure includes, among other things, transitioning an air dam of a vehicle between a first position and a second position, and providing an alert to a user. The alert indicates that the air dam is transitioning. The air dam is vertically higher when the air dam is in the first position than when the air dam is in the second position.

Another example of the foregoing method includes providing a first type of alert when the active air dam is transitioning from the first position to the second position, and providing a second, different type of alert when the active air dam is transitioning from the second position to first position.

In another example of any of the foregoing methods, the alert is an audible alert.

In another example of any of the foregoing methods, the alert is a visual alert.

In another example of any of the foregoing methods, the visual alert is displayed within an instrument cluster of the vehicle.

Another example of any of the foregoing methods includes providing the alert by adjusting light emitted by an illumination system of the vehicle.

In another example of any of the foregoing methods, adjusting the light comprises flashing the light.

In another example of any of the foregoing methods, adjusting the light comprises changing a color of the light.

In another example of any of the foregoing methods, the illumination system is an ambient lighting system of the vehicle.

Another example of any of the foregoing methods includes providing the alert by vibrating a steering wheel of the vehicle.

Another example of any of the foregoing methods includes providing the alert by vibrating a seat of the vehicle.

Another example of any of the foregoing methods includes providing the alert by inflating or deflating a seat of the vehicle.

Another example of any of the foregoing methods includes providing the alert by cinching a restraint device.

Another example of any of the foregoing methods includes providing the alert to the user within a passenger compartment of the vehicle.

In another example of any of the foregoing methods, the vehicle is moving during the transitioning and the providing.

Another example of any of the foregoing methods includes predicting that the vehicle will drive from a first area through a second area and, in response, transitioning the air dam by raising the air dam from the lowered position to the raised position prior to reaching the second area.

In another example of any of the foregoing methods, the transitioning is based on the second area having rougher terrain than the first area based on a previous drive through the second area.

In another example of any of the foregoing methods, the transitioning is based on the vehicle needing to turn when traveling through the second area.

In another example of any of the foregoing methods, an amount that the air dam is raised during the transitioning depends on a speed of the vehicle, a roughness of terrain in the second area, or both.

An active air dam system according to another exemplary aspect of the present disclosure includes, among other things, an air dam of a vehicle, an actuator assembly that transitions the air dam between a raised position and a lowered position; and a notification system that provides an alert to a user. The alert indicates that the air dam is transitioning.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details exemplary methods and systems that notify a user, such as a driver of a vehicle, that an active air dam is being lowered or being raised.

Figure 1:
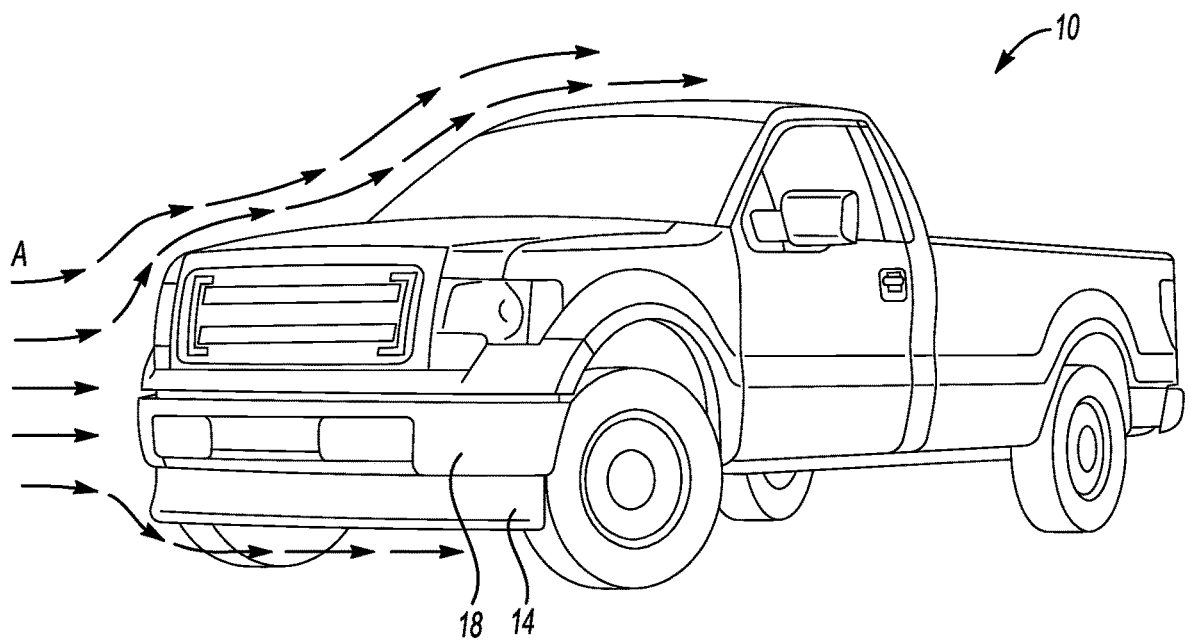
FIG. 1. illustrates a perspective view of a vehicle having an active air dam according to an exemplary embodiment of the present disclosure.

With reference to FIG. 1, a vehicle 10 includes an air dam 14 beneath a front bumper 18 of the vehicle 10. The air dam 14 is an active air dam that can be transitioned back and forth between a first position and a second position.

In the exemplary embodiment, the air dam 14 extends continuously from a passenger side of the vehicle 10 to a driver side of the vehicle 10. In another example, the air dam 14 includes a first air dam portion on the passenger side, and a second air dam portion on the driver side. The first and second air dam portions could be located, respectively, in front of a passenger side front wheel and a driver side front wheel. The first and second air dam portions can be independently controlled.

Figure 2:
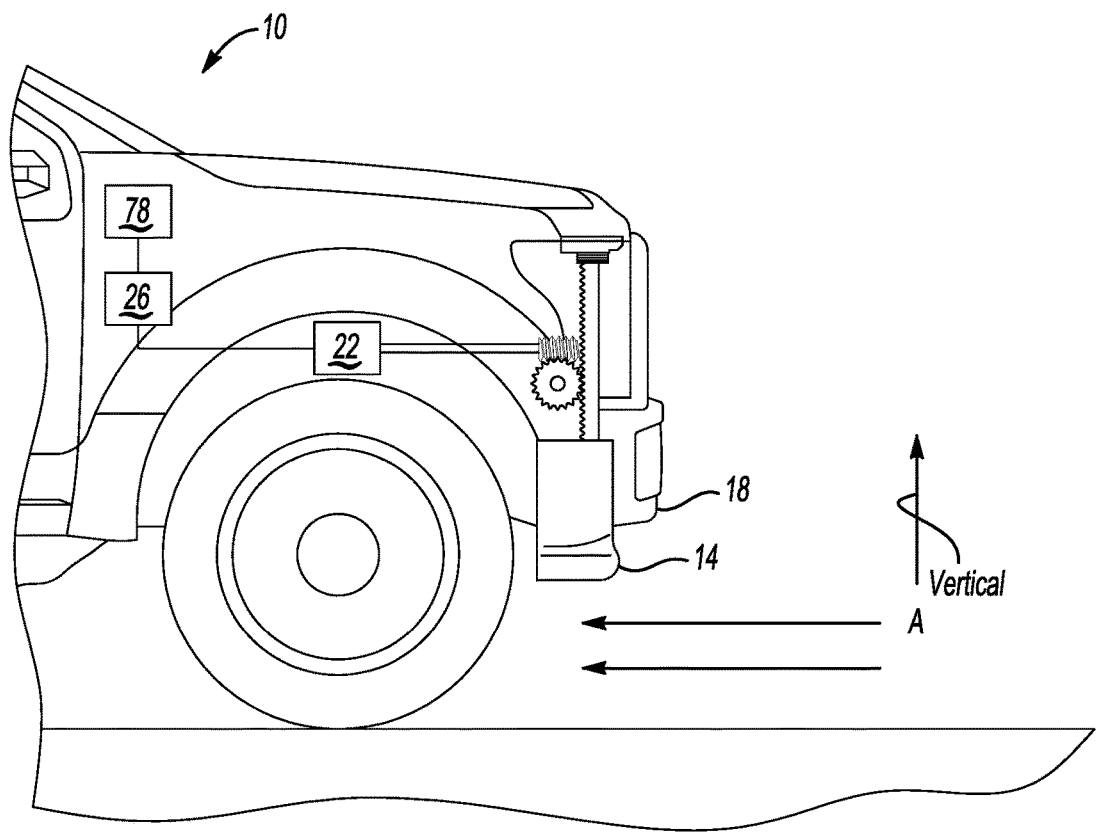
FIG. 2 illustrates a side view of a front portion of the vehicle of FIG. 1 showing the active air dam in an exemplary raised position.
Figure 3:
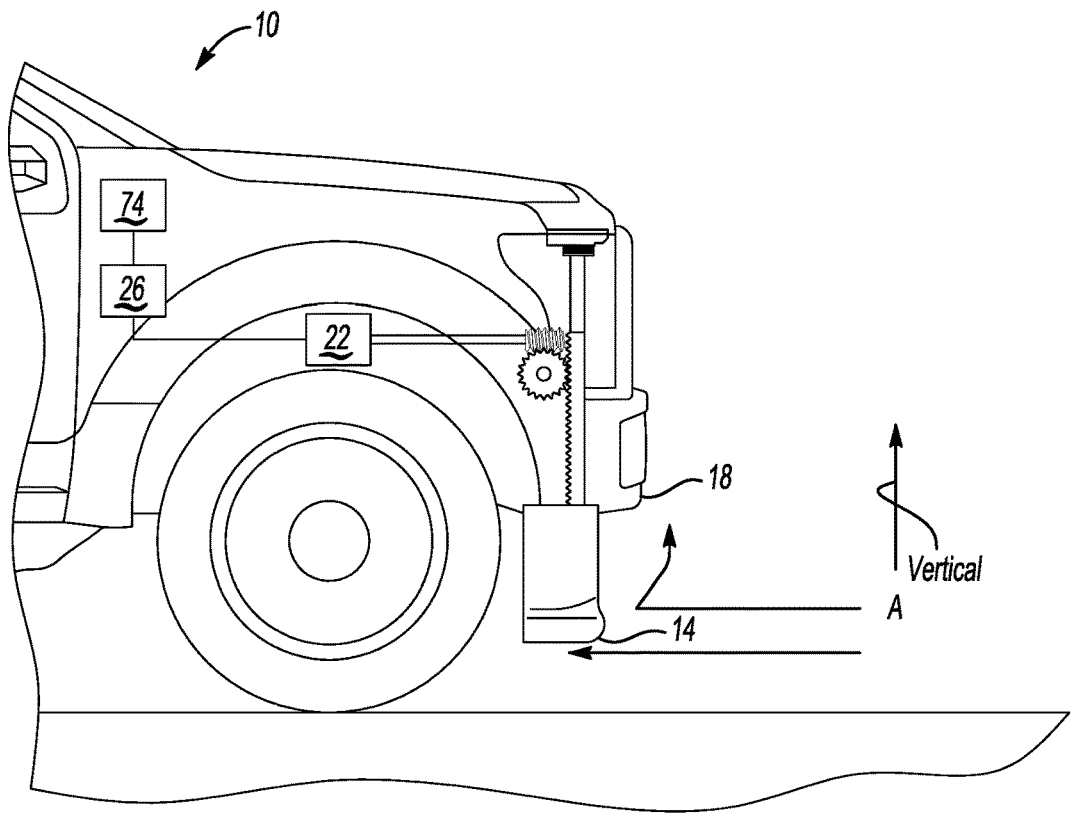
FIG. 3 illustrates the side view of the front portion of the vehicle of FIG. 2, but shows the active air dam in an exemplary lowered position.

In the exemplary embodiment, the air dam 14 is vertically higher when in the first position shown in FIG. 2 than when in the second position shown in FIGS. 1 and 3. The first position is thus a raised position, and the second position is a lowered position. The first position can be a fully raised or fully retracted position, but that is not required. The second position can be a fully lowered or fully extended position, but that is not required.

When the air dam 14 is in the first, raised position, the air dam 14 does not block as much airflow A beneath the vehicle 10 as when the air dam 14 is in the second, lowered position. At some speeds, the vehicle 10 may operate more efficiently when the airflow A beneath the vehicle 10 is reduced. Accordingly, it may be desirable to transition the air dam 14 to the second position when the vehicle 10 is operating at these speeds.

As can be appreciated, the air dam 14 is closer to the ground G when the air dam 14 is in the second, lowered position than when in the first, raised position. The air dam 14 is thus more likely to contact the ground G when the air dam 14 is in the second position than when the air dam 14 is in the first position.

The vehicle 10 includes an actuator assembly 22 and a control module 26. The actuator assembly 22 can transition the air dam 14 back and forth between the first and second positions. The actuator assembly 22 can transition the air dam 14 in response to a command from the control module 26.

In the exemplary embodiment, a user of the vehicle 10, such as the driver of the vehicle 10, is provided with an alert when the air dam 14 is transitioning. The components providing the alert can be considered a notification system. The transitioning is cannot be easily viewed by a user when the user is seated in the vehicle 10 and the vehicle 10 is moving. The alert informs the user that the transitioning is occurring and reinforces that the vehicle 10 is equipped with an active air dam, which may be an optional feature the user has paid for. The alert can also, in some examples, indicate that the air dam 14 is moving to the first position or moving to the second position. The user may desire the air dam 14 to be in the first, raised position when the vehicle 10 is stopped for aesthetic reasons. The alert can reinforce that the air dam 14 has moved or is moving to the desired position as the vehicle 10 completes its journey.

The alert indicates that the air dam 14 is transitioning. The user is thus continually reminded that the vehicle 10 includes the air dam 14 that is able to transition between the first and second positions. Since the air dam 14 is typically transitioning when the user is driving the vehicle 10, the user does not observe the air dam 14 transitioning. Providing the alert informs the user that the transitioning is occurring. Thus, the vehicle 10 can be moving during the transitioning and during the providing of the alert.

The user may drive the vehicle 10 differently if the user knows about the positioning of the air dam 14. When the air dam 14 is deployed, the user may be more cautious when operating the vehicle 10 over some types of terrain. If the user knows that the air dam 10 is retracted, the user can confidently proceed with off-road operation or low-speed maneuvers over uneven or rough conditions, including parking lots with railroad ties, snowbanks, etc.

The user may drive the vehicle 10 differently if the user knows about the positioning of the air dam 14. When the air dam 14 is deployed, the user may be more careful when operating over some types of terrain. If the user knows that the air dam 14 is retracted, the user can confidently proceed with off-road operation or low-speed maneuvers over uneven or rough conditions, including parking lots with railroad ties, snowbanks, etc.

Figure 4:
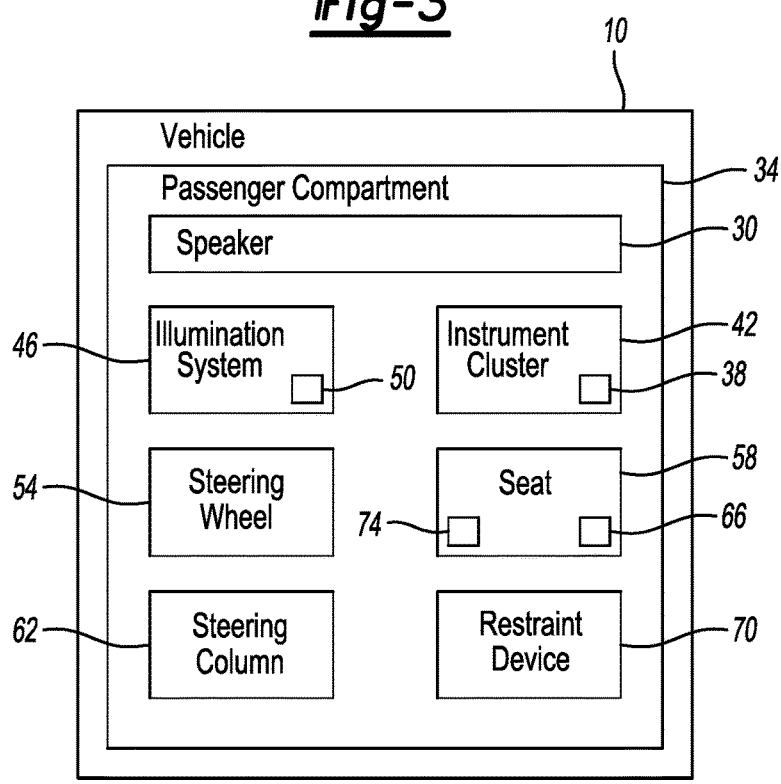
FIG. 4 illustrates a highly schematic view of selected portions of the vehicle of FIG. 1.

With reference now to the schematic view of FIG. 4 and continuing reference to FIGS. 1-3, the alert could be an audible alert, a visual alert, a tactile alert, or some combination of these. The user can, in some examples, disable the alert feature, or customize the type of alert.

Generally, audible alerts can be heard by the user. Exemplary audible alerts could be an audible ding or chime that is emitted from a speaker 30. The audible alerts can be heard by the user within a passenger compartment 34 of the vehicle 10 in this example.

Generally, visual alerts can be seen by user. Exemplary visual alerts could include illuminating an icon 38 within an instrument cluster 42 of the vehicle 10. Another example visual alert could be an adjustment to light emitted by an illumination system 46 of the vehicle 10. Such an adjustment could be a flashing of one or more lights 50 of the vehicle 10, such as cupholder lights. Another adjustment could be changing a color of the lights 50—blue to red, for example. Another adjustment could be changing an intensity or color of lights 50 within the vehicle 10, such as ambient lights or outside decorative signature lighting of the vehicle 10.

Generally, tactile alerts can be felt by the user. Exemplary tactile alerts could include vibrating a device, such as a steering wheel 54 or seat 58 within the vehicle 10. Other exemplary tactile alerts could include raising or lowering a steering column 62 of the vehicle 10, or inflating or deflating an air bladder 66 within the seat 58 of the vehicle 10 such that an area of the seat 58 inflates or deflates and can be felt by a person seated in the seat 58. Yet another example tactile alert could include cinching a restraint device 70 tighter around the user, or causing a massager 74 of the seat 58 to vibrate the user within the seat 58.

In some examples, the type of alert changes based on the transitioning. For example, a first type of alert may be provided when the air dam 14 is being lowered and transitioning from the first position to the second position. A second, different type of alert can then be provided when the air dam 14 is being raised and is transitioning from the second position to first position. The first alert could include a single audible beep and the icon 38 being illuminated within the instrument cluster 42. The second alert could include a double audible beep and a different, second icon being illuminated within the instrument cluster 42.

Another example of changing the type of alert could include vibrating the seat 58 of the vehicle 10 according to a first sequence when the air dam 14 is being lowered and vibrating the seat 58 of the vehicle 10 according to a different, second sequence when the air dam 14 is being raised. The vibrating of the seat 58 could occur by actuating the massager system 74 of the seat 58.

The transitioning of the air dam 14 may be relatively slow in some examples. For example, the actuator assembly 22 could be relatively small and lack the power necessary for a faster transition of the air dam 14. The actuator assembly 22 could also take considerable time to transition the air dam 14 due to temperature effects, aging/dirty mechanisms, etc.

If the vehicle 10 is traveling at high speeds, in may be beneficial for the transitioning to occur more rapidly than if the vehicle 10 is traveling at lower speeds. That is, if the vehicle 10 is travelling at a high speed and enters a rough section of road with the air dam 14 in the second position, there may be very little time to raise the air dam 14. r The example vehicle 10 is configured to continually retrieve information relating to road conditions, and particularly the roughness of the terrain. For example, during a drive cycle, if the vehicle 10 traverses over particularly rough terrain that could potentially lead to damaging contact between the road surface and the air dam 14, the vehicle 10 can record information about the location of the rough terrain. The information can be stored as a Global Positioning System coordinates. The information can be saved remotely from the vehicle 10, saved within a memory portion 78 of the vehicle 10, or both.

During a subsequent drive cycle, when the vehicle 10 is approaching the location of the rough terrain, the control module 26 can command the actuator assembly 22 to proactively retract the air dam 14 to avoid damage.

In this example, the control module 26 initiates the raising of the air dam 14 based, at least in part, on information obtained during a previous journey of the vehicle 10 over the rough terrain. In another example, the control module 26 could obtain the information indicating that rough terrain is upcoming from GPS mapping, which can, in some examples, include road surface information.

In this example, the control module 26 can thus predict that the vehicle 10 will drive from a first area through a second area and, in response, transition the air dam 14 by raising the air dam 14 from the lowered position to the raised position prior to reaching the second area. The prediction of the vehicle 10 driving through the second area can be based on a route input by the user, or can be based on a road that the vehicle 10 is currently traveling on, and an upcoming section of that road. The transitioning can be based on the second area having rougher terrain than the first area based on a previous drive through the second area.

As can be appreciated, braking and cornering of the vehicle 10, especially aggressive braking and cornering, can cause the air dam 14 to move vertically against the road R, which can potentially damage the air dam 14. In addition to recalling information about rough terrain, the vehicle 10 may recall information about areas of the road R that potentially require aggressive cornering or braking. The vehicle 10 can then proactively raise the air dam 14 when approaching these areas of the road.

For example, if the vehicle 10 leans heavily while it goes around a freeway cloverleaf, the air dam 14 can be raised when the vehicle 10 is approaching the cloverleaf. The information relating to rough terrain, aggressive cornering, and aggressive braking can be stored in a look-up table within the memory portion 78 or outside the vehicle 10.

Swaying or braking of the vehicle 10 due to avoiding objects, such as other vehicles, may be recognized by machine learning of Advanced Driver Assistance System camera pictures. These types of maneuvers may not be stored for recalling later in connection with transitioning the air dam 14 as these types of maneuvers are unlikely to be repeated or associated with a particular area.

A distance that the air dam 14 is retracted in response to upcoming rough terrain, an upcoming aggressive cornering or braking can be stored in the lookup table and can vary based on, for example, temperature and vehicle speed. The temperature part of the lookup table can be continually updated based on a moving average of retraction time at temperature.

Figure 5:
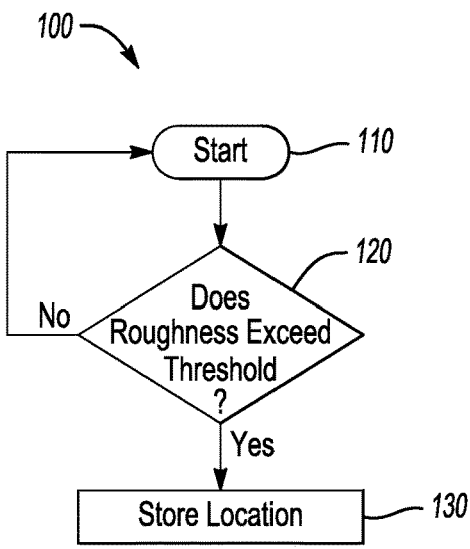
FIG. 5 illustrates a flow of a method of storing a location according to an exemplary aspect of the present disclosure.

With reference not to FIG. 5, an example method 100 of storing information for air dam transitioning beings at a step 110. Next, at a step 120, when the vehicle 10 is travelling, a roughness of the terrain is compared to a roughness threshold value. If the roughness of the terrain does not exceed the roughness threshold value, the method 100 returns to the start. If the roughness of the terrain does exceed the roughness threshold value, the method 100 moves to a step 130 where the location of the rough terrain is stored using GPS coordinates, for example.

Figure 6:
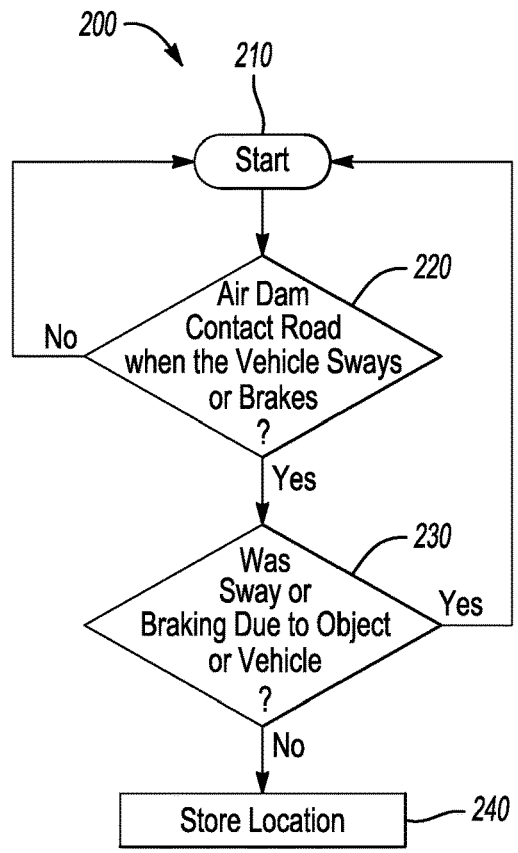
FIG. 6 illustrates a flow of another method of storing a location according to another exemplary aspect of the present disclosure.

With reference not to FIG. 6, an example method 200 of storing information for air dam transitioning beings at a step 210. Next, at a step 220, when the vehicle 10 is travelling, swaying and braking of the vehicle 10 is continually monitored. If the swaying or braking at a particular location causes the air dam 14 to contact a surface of the road, the method 200 moves to the step 230. At the step 230, the method 200 assesses whether the swaying or braking was due to an object or vehicle in the road. If so, the method 200 returns to the step 210. If the swaying or braking was not due to an object or vehicle in the road, the particular location is saved at a step 240.

Figure 7:
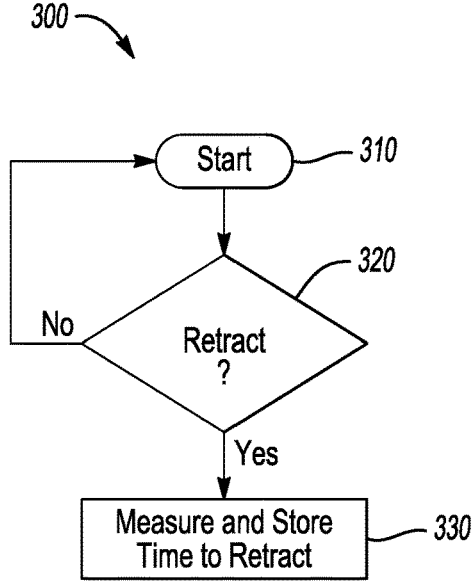
FIG. 7 illustrates a flow of a method of storing the active air dam retraction time according to yet another exemplary aspect of the present disclosure.

Referring to FIG. 7, a method 300 of assigning retraction times for the air dam 14 begins at a step 310. Next, at a step 320, the method 300 assesses whether the air dam 14 has been commanded to retract. If not, the method 300 returns to the step 310. If the air dam 14 has been commanded to retract, the method 300 moves to the step 330 where the time it takes for the air dam 14 to retract is measured and stored in a look-up table.

As can be appreciated, retracting the air dam 14 may take more time in cold weather than warm weather. By storing times associated with temperatures in the look up table, the command to transition the air dam 14 can be issued far enough in advance of approaching a rough section of road to permit the air dam 14 to be fully transitioned to a raised position. That is, in colder weather, the command to transition to the raised position in response to upcoming rough terrain may be issued sooner than if the vehicle 10 is traveling in warmer weather.

In addition to commanding the air dam 14 to retract, the control module 26 may pre-charge brakes or adjust trailer brake sensitivity in response to an upcoming road condition, such as a sharp corner or rough terrain. Precharging the brakes of the vehicle 10 can enhance braking readiness, which can in turn reduces stopping distances in emergency situations. The precharging can cause the brake pads to press lightly against the brake discs, ensuring that the brake system is optimally prepared for the upcoming braking.

In addition to commanding the air dam 14 to retract, the control module 26 may temporarily close Active Grille Shutters in response to an upcoming road condition such as a sharp corner or rough terrain. Closing the Active Griller Shutters can protect a cooling system of the vehicle from potentially damaging debris.

In addition to commanding the air dam 14 to retract, the control module 26 may lock an electrical glove box release and/or prevent seat and steering wheel adjustments in response to an upcoming road condition, such as a sharp corner or rough terrain.

In addition to commanding the air dam 14 to retract, the control module 26 may reduce a sensitivity of capacitive switches within the vehicle 10 in response to an upcoming road condition, such as a sharp corner or rough terrain. Reducing the sensitivity of capacitive switches can prevent inadvertent actuation. The switches may be located in an overhead console or instrument panel of the vehicle 10.

The amount that the air dam 14 is extended or retracted can be varied based on a ride height of the vehicle 10. If, for example, the vehicle 10 is carrying a heavy load, the air dam 14 may need to be retracted farther to avoid contact with the road than if the vehicle 10 were carrying a lighter load. The vehicle 10 could include sensors with shocks of the vehicle 10 that monitor the position of the shocks to assess a right height of the vehicle 10. In other examples, the vehicle 10 could include height sensors that rely on ultrasonic or RADAR to assess a ride height of the vehicle 10.

In some examples, the sensors in the shocks can reveal that the vehicle 10 is heavily loaded in its rear, which can cause a front of the vehicle 10 to be slightly raised. The air dam 14 can be extended further when the vehicle 10 is loaded in this way rather than if the vehicle 10 were more evenly loaded. Example if vehicle is evenly heavily loaded the air dam may not extend as far.

Some features of the disclosed examples include alerting a user to a transitioning of an air dam using an alert. The user can turn off or on the alert feature via a touch screen interface, for example. The alert can be an audible ding or chime (similar to what is done on an airplane to warn of turbulence) along with visual indication on cluster The alert can be a change in the interior/exterior lighting, a cinching of a restraint device, or some combination of these.

Features providing improved control of the air dam can include "remembering" rough sections of road via GPS and reacting prior to encountering those rough section again by proactively transitioning the air dam. Another feature is the distinguishing between vehicle sway cause by speed (around a corner for example) remembering this for later use and vehicle sway caused by objects/vehicle in the road which are not remembered.

A distance that air dam begins to retract in advance of a previous rough road section is a SW lookup table based on temperature and vehicle speed. In addition to transitioning the air dam, the vehicle and/or trailer brakes can be precharged, and an active grille system can be closed. The precharging prepares the brakes for use. The closing of the active grille system helps prevent road debris from damaging components of the vehicle. The electrical glove box release can be locked in advance of rough terrain, and adjusting seat or steering wheel positions may be prevented. Further, switch sensitivity of may be reduced to hinder inadvertent actuation. The air dam extension can be varied based on vehicle ride height. Assessing the ride height can take into account both even and uneven loading (back heavily loaded causing front to rise slightly).

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. An active air dam notification method, comprising:
   transitioning an air dam of a vehicle vertically between a first position and a second position, the air dam vertically higher when the air dam is in the first position than when the air dam is in the second position;
   providing an alert to a user, the alert indicating that the air dam is transitioning; and
   predicting that the vehicle will drive from a first area through a second area and, in response, transitioning the air dam by raising the air dam from the second position to the first position prior to reaching the second area.

2. The active air dam notification method of claim 1, wherein the transitioning is based on the second area having rougher terrain than the first area based on a previous drive through the second area.

3. The active air dam notification method of claim 1, wherein the transitioning is based on the vehicle needing to turn when traveling through the second area.

4. The active air dam notification method of claim 1, wherein an amount that the air dam is raised during the transitioning depends on a speed of the vehicle, a roughness of terrain in the second area, or both.

* * * * *